US008874662B2

(12) United States Patent
Graham et al.

(10) Patent No.: US 8,874,662 B2
(45) Date of Patent: Oct. 28, 2014

(54) METHOD AND APPARATUS FOR CONTROLLING UNSOLICITED MESSAGES IN A MESSAGING NETWORK USING AN AUTHORITATIVE DOMAIN NAME SERVER

(76) Inventors: Alan Graham, Lawrenceville, GA (US); Christine Graham, Lawrenceville, GA (US)

(*) Notice: Subject to any disclaimer, the term of this patent is extended or adjusted under 35 U.S.C. 154(b) by 1001 days.

(21) Appl. No.: 12/253,922

(22) Filed: Oct. 17, 2008

(65) Prior Publication Data

US 2010/0100957 A1    Apr. 22, 2010

(51) Int. Cl.
G06F 15/16     (2006.01)
H04L 29/06     (2006.01)
H04L 12/58     (2006.01)
G06Q 10/10     (2012.01)

(52) U.S. Cl.
CPC .......... *G06Q 10/107* (2013.01); *H04L 63/0227* (2013.01); *H04L 63/1441* (2013.01); *H04L 51/12* (2013.01); *H04L 51/28* (2013.01)
USPC ........................................................ 709/206

(58) Field of Classification Search
CPC ..... H04L 51/00; H04L 51/12; H04L 61/1511; H04L 29/12066; G06F 21/00; G06F 21/55
USPC ........................................................ 709/206
See application file for complete search history.

(56) References Cited

U.S. PATENT DOCUMENTS

| 6,650,890 | B1 | 11/2003 | Irlam et al. |
| 7,039,949 | B2 | 5/2006 | Cartmell et al. |
| 7,133,660 | B2 | 11/2006 | Irlam et al. |
| 7,236,769 | B2 | 6/2007 | Irlam et al. |
| 7,240,095 | B1* | 7/2007 | Lewis ............................ 709/206 |
| 7,277,695 | B2 | 10/2007 | Petry et al. |
| 7,634,808 | B1* | 12/2009 | Szor et al. ........................ 726/22 |
| 2003/0097564 | A1* | 5/2003 | Tewari et al. .................. 713/171 |
| 2006/0004896 | A1 | 1/2006 | Nelson et al. |

(Continued)

FOREIGN PATENT DOCUMENTS

KR    1020050102753 A    10/2005

OTHER PUBLICATIONS

Pogue, David. The Internet: The Missing Manual. O'Reilly Media, Inc. Jul. 21, 2006. pp. 1-47.*

(Continued)

*Primary Examiner* — John MacIlwinen
(74) *Attorney, Agent, or Firm* — Baker Donelson Bearman Caldwell & Berkowitz PC

(57) ABSTRACT

Methods for controlling unsolicited messages in a messaging network using an authoritative domain name (DNS) server, in which a requester intending to send an e-mail message to a recipient queries the DNS server associated with the recipient's domain. The response sent from the DNS server is dependent upon a security policy associated with the requester, which results from interrogations to determine the probability that the requester is sending unsolicited messages or spam. A validity factor is set to a first indicator if the request passes or to a second indicator if the request fails. The response from the DNS server provides the network address if the validity factor is set to the first indicator. A suitable not-the-network-address response is sent if the validity factor is set to the second indicator. The authoritative DNS server thereby controls, blocks, or reroutes the message and lightens the load on the recipient's mail server and ISP(s).

26 Claims, 7 Drawing Sheets

(56) References Cited

U.S. PATENT DOCUMENTS

| | | | |
|---|---|---|---|
| 2006/0031298 A1 | 2/2006 | Hasegawa | |
| 2006/0031325 A1 | 2/2006 | Cheng | |
| 2006/0031483 A1* | 2/2006 | Lund et al. | 709/224 |
| 2006/0036690 A1* | 2/2006 | O'Neil | 709/206 |
| 2006/0069667 A1* | 3/2006 | Manasse et al. | 707/2 |
| 2006/0146816 A1* | 7/2006 | Jain | 370/389 |
| 2007/0118669 A1* | 5/2007 | Rand et al. | 709/245 |

OTHER PUBLICATIONS

Bautts et al. Linux Network Administrator's Guide, Third Edition. O'Reilly Media, Inc. Feb. 3, 2005. pp. 1-20.*

Barracuda Networks.com; web pages—company overview, spam firewall, spam information, Barracuda span firewall features, Barracuda spam firewall deployment, Barracuda spam firewall administration, Barracuda spam firewall FAQ; Barracuda Networks, Inc., 3175 Winchester Blvd., Campbell, CA 95008; 2009 (for purposes of initial examination, at least as early as Oct. 17, 2008) pp. 1-15.

Postini Services: Protect and Secure Your Existing Email System, How Inbound Email Flows Through The Service, Message Security FAQ; Google Inc., 1600 Amphitheatre Parkway, Mount View, CA 94043 (for purposes of initial examination, at least as early as Oct. 17, 2008) pp. 1-8.

International Search Report, PCT/US2009/060592.

Google Public DNS FAQ, http://code.google.com/speed/public-dns/faq.html, printed May 31, 2011.

"MX Logic® Email Defense Service", MX Logic, Inc., 9781 S. Meridian Blvd., Suite 400, Englewood, CO 80112 (2007-2008).

"MX Logic® Email and Web Security Services", MX Logic, Inc., 9781 S. Meridian Blvd., Suite 400, Englewood, CO 80112 (2009).

"MX Logic® Email Attack Protection", MX Logic, Inc., 9781 S. Meridian Blvd., Suite 400, Englewood, CO 80112 (2009).

"Innovative, Reliable Technology—The Key to Protection Against Online Threats", MX Logic, Inc., 9781 S. Meridian Blvd., Suite 400, Englewood, CO 80112 (2009).

"Downloading MX Logic Spam Control for Outlook®", MX Logic, Inc., 9781 S. Meridian Blvd., Suite 400, Englewood, CO 80112 (2009).

"MX Logic® Email Defense Service", MX Logic, Inc., 9781 S. Meridian Blvd., Suite 400, Englewood, CO 80112 (2009).

"Features and Benefits of the MX Logic® Email Defense Service", MX Logic, Inc., 9781 S. Meridian Blvd., Suite 400, Englewood, CO 80112 (2009).

"MX Logic® Email Defense Service Packages", MX Logic, Inc., 9781 S. Meridian Blvd., Suite 400, Englewood, CO 80112 (2009).

"MX Logic® Spam Blocking", MX Logic, Inc., 9781 S. Meridian Blvd., Suite 400, Englewood, CO 80112 (2009).

"MX Logic® Spam Blocking Integrates Layered Protection", MX Logic, Inc., 9781 S. Meridian Blvd., Suite 400, Englewood, CO 80112 (2009).

"MX Logic® Spam Blocking—Features & Benefits", MX Logic, Inc., 9781 S. Meridian Blvd., Suite 400, Englewood, CO 80112 (2009).

"MX Perimeter Defense: the on-premises lifesaver", MX Logic, Inc., 9781 S. Meridian Blvd., Suite 400, Englewood, CO 80112 (2009).

* cited by examiner

Exemplary Method For Sending an Email Message

Method for Controlling Unsolicited Messages in a Messaging Network Using an Authoritative Name Server Method for Blocking Spam Using an Authoritative Name Server Initial Connection and Establishing Security Policy Request Processing Policy Manager

METHOD AND APPARATUS FOR CONTROLLING UNSOLICITED MESSAGES IN A MESSAGING NETWORK USING AN AUTHORITATIVE DOMAIN NAME SERVER

TECHNICAL FIELD

The present invention relates to apparatus and methods of sending messages in messaging network. More particularly, the present invention relates to controlling transmission of unsolicited messages within messaging networks through the use of authoritative domain name servers.

BACKGROUND OF THE INVENTION

Unsolicited mail is not a new concept; unsolicited mail has been around for decades and arrives through paper mail delivered by postal mail or by hand to people's mailboxes. The unsolicited mail typically is advertising or promotional materials of a commercial nature. While providing a way to communicate information, the practice has become known generally as "junk mail" because in most instances the unsolicited mail is thrown away, or "junked" as not relevant to the addressee. Significant amounts of money are spent on preparing and delivering of commercial messages for the potential of a small percentage of responses.

The communication of unsolicited commercial messages has recently migrated into preparation and distribution of electronic mail ("e-mail") communicated through networked computer systems and delivered via e-mail servers into addressee's e-mail boxes. Generally, the costs for the advertiser using electronic mail is lower, which reduced costs arise primarily from the reduced distribution expenses. However, the burden of the unsolicited messages is borne by others. This includes network providers who establish and maintain network capacity for handing messages. Addressees must sort through incoming e-mail to identify desired e-mail from unwanted e-mail and delete the unwanted e-mail. Some e-mail recipients receive daily a significant volume of unsolicited e-mail communications (for example, some recipients receive hundreds, if not more, unsolicited e-mail daily). Any unsolicited e-mail is referred to in the messaging trade as "spam" mail. Such electronic mail of a commercial nature occupies bandwidth, cancels delivery of messages, and upon delivery takes recipient's time to sort and delete unwanted messages. Persons who engage in the transmission of large volumes of unsolicited mail are referred to in the industry as "spammers" and that term is used herein.

Messaging systems use a hierarchical addressee naming system with a plurality of domain names that allow both people and computer machines to determine where to send the message traffic. This is true whether visiting a website on the network or sending an e-mail to a recipient. For every domain in the domain name system, there is a set of name servers that can be defined at the domain registry. These servers are known as "authoritative name servers", and are the final authority for use in resolving DNS requests for a domain.

Resolving a DNS request for a domain name is a common activity in messaging, regardless of whether the message being sent is sent by a "spammer", or the sender has a legitimate reason to send an e-mail message to a given e-mail address. For each e-mail message, a DNS query must be made for the domain name to determine the messaging network address that identifies how to route the e-mail message.

There have been many attempts to thwart unwanted e-mails. However the current systems are resource intensive and suffer from degraded effectiveness due to concerns about false positives on identifying desired e-mail from unsolicited and unwanted e-mail. These current techniques for stopping unsolicited electronic mail typically involve evaluating the messages for sender and/or content. Some systems conduct a check of the sender's network address or identifier against a current list of known commercial e-mail distributors or "spammers" using the real-time DNS blacklists. These lists are generated by interested persons and published for information and use in the messaging networks. Other systems filter the messages based on message content. These techniques are conducted by the server at which mail is received for distribution to an e-mail recipient associated with that server. Other filtering techniques occur at the client or e-mail recipient level. These often permit the e-mail recipient to adjust the selectivity of the technique in filtering e-mail. While these techniques intercept many unsolicited e-mails, there are drawbacks. These techniques generally slow the transmission and distribution of messages through the network, and thus can block or delay legitimate e-mails. Furthermore, spammers learn what techniques are in use and change their practices accordingly, causing blocking techniques to become outdated and ineffective.

Accordingly, there is a need in the art for an improved apparatus and method for controlling the flow of unsolicited e-mail messages within a messaging network by distinguishing between requests from legitimate e-mail sources and requests from unsolicited e-mail sources and routing of the message traffic based on that differentiation. It is to such that the present invention is directed.

SUMMARY OF THE PRESENT INVENTION

The present invention meets the needs in the art by providing a computer-based messaging network for sending electronic mail between end users of the messaging network, the messaging network configured for reducing communication of unsolicited sent by at least one sender end user mimicking a valid request for a domain name address in order to send unsolicited electronic mail to a recipient end user, each end user accessing the computer-based messaging network through one of a plurality of network service providers using computers equipped with communications devices for interactive communication through an electronic mail server operated by the respective network service provider into and from the messaging network for sending and receiving electronic messages between end users, each end user having a unique local name associated with the respective network service provider, which local name in combination with a domain name of the network service provider defines a unique electronic mail address that allows end users to send and receive messages, the electronic mail server of the network service provider coordinates sending and delivery of electronic mail for the end users thereof, the network service provider further including one or more DNS servers that maintain a list of domain names and associated network addresses by which the DNS server responds to requests from the respective electronic mail server for the network address of a domain name to which electronic mail is to be sent to an end user, the network also including at least one final authoritative index of the network service providers including the network address at which the network service provider can be reached within the network, the final authoritative index maintained by an authoritative domain name microprocessor computer and validly accessed by the DNS server of the network service provider in the event the DNS server is unable to provide the network address of the domain name to which electronic mail is to be sent, the computer-based messaging network further comprising an authoritative domain name microprocessor computer configured (i) for server-side reduction of unsolicited messages communicated through the network in response to receiving a domain name request from one of a plurality of requesters operating within a network served by the authoritative domain name microprocessor computer server, said one requester associated with a sender end user to send an electronic message to a recipient end user, the domain name request made by the requester for the purpose of obtaining a network address associated with a domain name of the recipient end user maintained by the authoritative domain name microprocessor computer server in the final authoritative index and for (ii) communicating a response to the requester. At least one sender end user mimicking a requester and making a domain name request for obtaining a network address associated with a domain name of a recipient end user to receive an unsolicited message from the sender end user. An analyzer interrogates the domain name request and in response to the interrogation sets a validity factor to a first indicator if the request passes the interrogation and to a second indicator if the request fails the interrogation, the interrogation at least evaluating the domain name of the requester to determine whether the domain name request originates with the one sender end user mimicking a requester. A response generator determines a response to the domain name request based on the validity factor, whereby the response provides the network address associated with the domain name subject if the request passes the interrogation. The authoritative domain name microprocessor computer responds to domain name requests made by a valid requester and, for reducing on the server side the volume of unsolicited electronic messages communicated within the messaging network, rejects domain name requests made by the sender end user mimicking a valid domain name request made by the DNS server of one of the network service providers.

In another aspect, the present invention provides a messaging network configured for communicating electronic messages from a first user to a second user while reducing communication of unsolicited messages, each user uniquely identified by a local-part name and a mail-domain domain name, the mail-domain domain name associated with a network service provider that provides electronic mail service to one or more users, comprising at least one root server that maintains an authoritative index of valid mail-domain names and associated network addresses accessible by each network service provider to determine a final network address for sending electronic mail within the network, with a plurality of network service providers, each providing electronic mail service through an electronic mail server to a plurality of users, each user having a unique local-part name and a mail-domain domain name associated with the mail server. An authoritative domain name microprocessor computer configured for (i) receiving a domain name request from a requester associated with a first user seeking to send a message to a second user as a recipient for the purpose of obtaining a network address associated with the mail-domain domain name of the second user and communicating a response to the requester while (ii) reducing on the server-side the number of unsolicited messages allowed to communicate through the messaging network. The authoritative domain name microprocessor computer comprises an analyzer that interrogates the domain name request and in response to the interrogation sets a validity factor to a first indicator if the request passes the interrogation and to a second indicator if the request fails the interrogation, the interrogation at least evaluating the domain name of the requester to determine whether the domain name request originates with a sender end user that is mimicking a requester making a valid domain name request. A response generator determines a response to the domain name request based on the validity factor, whereby the response provides the network address associated with the domain name subject of the request if the request passes the interrogation. The validity factor being set as the first indicator permits the message to be sent to the recipient end user and being set as the second indicator prevents the message from being sent to the recipient end user. The authoritative domain name microprocessor computer responds to domain name requests made by a valid requester and, for reducing on the server-side the volume of unsolicited electronic messages communicated within the messaging network, rejects requests made by the sender end user mimicking a valid domain name request.

In another aspect, the present invention provides a method of blocking communication of unsolicited messages in a computer-based messaging network configured for sending messages from sender end users to recipient end users with an authoritative domain name microprocessor computer configured to restrict transmission of an unsolicited message from a sender end user to a recipient end user, each end user accessing the computer-based messaging network through one of a plurality of network service providers using computers equipped with communications devices for interactive communication through an electronic mail server operated by the respective network service provider into and from the messaging network for sending and receiving electronic messages between end users, each end user having a unique local name associated with the respective network service provider, which local name in combination with a domain name of the network service provider defines a unique electronic mail address that allows end users to send and receive messages, the electronic mail server of the network service provider coordinates sending and delivery of electronic mail for the end users thereof, the network service provider further including one or more DNS servers that maintain a list of domain names and associated network addresses by which the DNS server responds to requests from the respective electronic mail server for the network address of a domain name to which electronic mail is to be sent to an end user, the network also including at least one final authoritative index of the network service providers including the network address at which the network service provider can be reached within the network, the final authoritative index maintained by an authoritative domain name microprocessor computer validly accessed by the DNS server of the network service provider in the event the DNS server is unable to provide the network address of the domain name to which electronic mail is to be sent, the method of the computer-based messaging network further comprising the steps of:

(a) providing in a messaging network an authoritative domain name microprocessor computer configured for (i) receiving a domain name request from a requester end user associated with a sender of a message to a recipient end user, the domain name request made for the purpose of obtaining a network address associated with the domain name of the recipient end user which network address is maintained by the authoritative domain name microprocessor computer in the final authoritative index and for communicating a response to the requester, and (ii) reducing on the server-side unsolicited messages communicated through the network;

(b) analyzing the domain name request based on an enforcement policy and in response setting a validity factor to a first indicator if the request passes the interrogation and to a second indicator if the request fails the interrogation, the enforcement policy at least evaluating the domain name of the requester to determine whether the domain name request originates with a sender end user that is mimicking a requester making a valid domain name request; and (c) returning a response to the domain name request based on the validity factor, the response comprising a network address associated with the domain name when the validity factor is set to the first indicator and the response comprising not the network address if the validity factor is set to the second indicator, whereby the validity factor set as the first indicator permits the message to be sent to the recipient end user and the second indicator prevents the message from being sent to the recipient end user, whereby the authoritative domain name microprocessor computer responds to domain name requests made by a valid requester and, for reducing on the server-side the volume of unsolicited electronic messages communicated within the messaging network, rejects requests made by the sender end user mimicking a valid domain name request by the requester associated with a network service provider.

Objects, advantages, and features of the present invention will be apparent upon a reading of the following detailed description in conjunction with the drawings and the appended claims.

DETAILED DESCRIPTION

Figure 1:
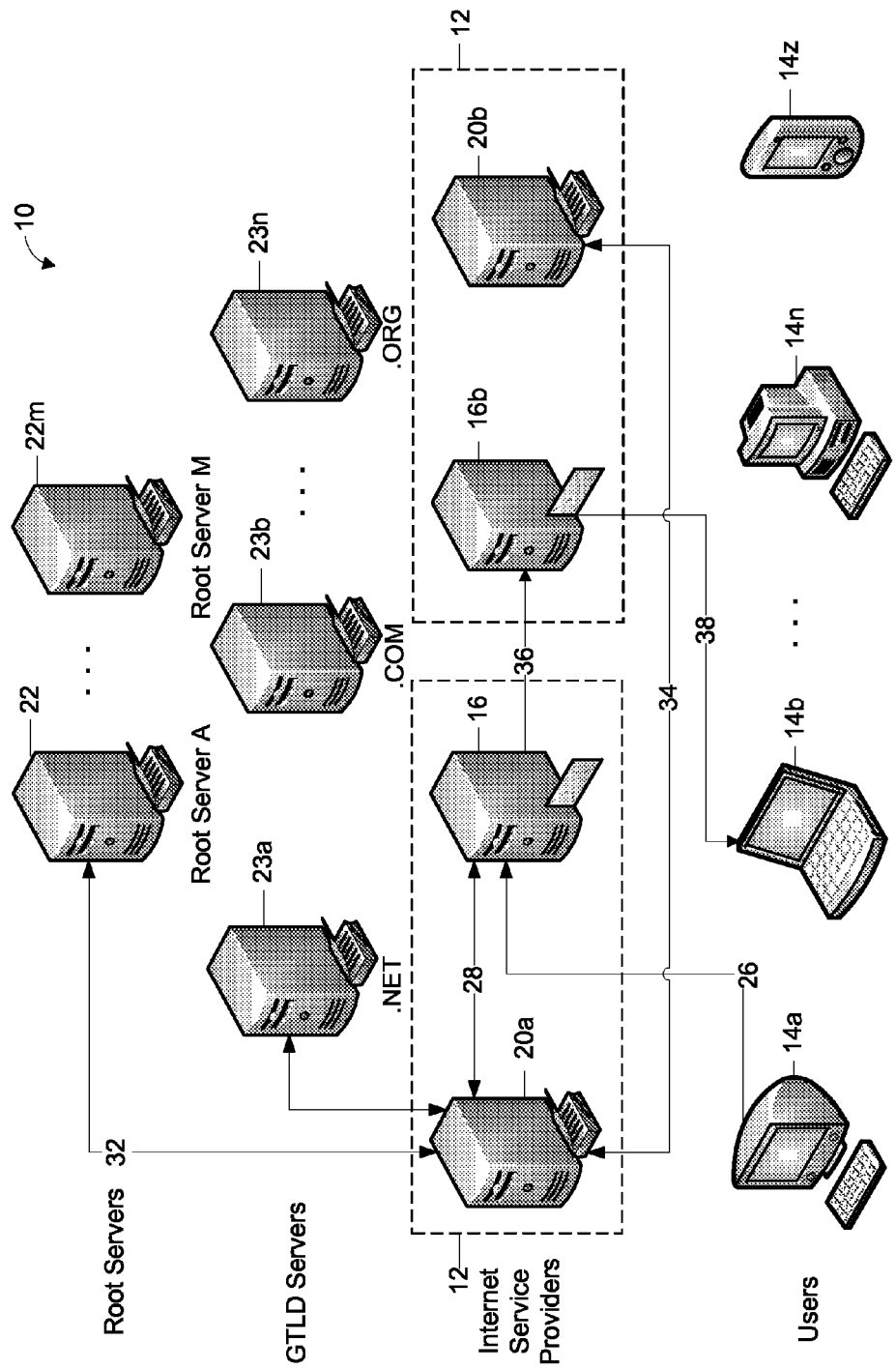
FIG. 1 illustrates in a schematic diagram a messaging network in which e-mail can be sent from a first e-mail address of a first e-mail service provider to a second e-mail address of a second e-mail service provider.

With reference to the drawings in which like parts have like identifiers, FIG. 1 illustrates in a schematic diagram a computer-based messaging network 10 in accordance with the present invention. The network 10 includes a plurality of network service providers 12 that provide network access services for a plurality of end users 14. Network service providers are referenced herein as "ISPs". The end users 14 have computers equipped with communications devices for interactive communication with the respective ISP and thus for communication into and from the network for accessing information available on computers or servers of others through the plurality of ISPs in the network 10. Each ISP 12 handling end users 14 also includes an electronic mail server 16. Each end user 14 has a unique local name associated with the ISP. The combination of the local name and the service provider defines an address that allows other users to send messages to the particular end user. The electronic mail server 16 communicates messages to and from the end users 14 for the ISP.

Each ISP that provides e-mail service has an e-mail server 16. The e-mail server 16 coordinates sending and delivery of electronic mail for the users 14 associated with the particular ISP. The ISP also includes, or has network access to, a DNS server 20. The DNS server 20 maintains a list of domain names and associated network addresses. The DNS server 20 responds to requests for the network address of a domain name. The network address is necessary in order for messages to be communicated between users 14.

The network also includes a plurality of root servers 22. The root servers 22 maintain the final authoritative index of the network service providers including the network address at which the service provider can be reached within the network though generic top level domains ("GTLD") 23.

With reference to FIG. 1, the following describes an exemplary method for sending an e-mail message from the end user 14a (sender) of one ISP to the end user 14b (recipient) of another ISP where the two end users do not share the same ISP network service provider. The sender creates an e-mail message destined for the recipient. The sender sends 26 the message through the network to the mail server 16 for the network provider of the sender. The message is sent with a request for the mail server 16 to send the message to the recipient end user 14b. The message includes the recipient's user name and the domain name of the service provider for the recipient.

Upon receipt, the mail server 16 parses the message to determine the network destination address of the recipient. This is determined by the mail server 16 sending 28 a DNS request to the ISP local caching server 20a. The request provides the domain name of the proposed message recipient for which the network address is required. The DNS lookup enables the mail server 16 to retrieve the network provider (ISP) address of the destination or recipient e-mail server of the recipient end user 14b.

The DNS server 20a may have the requested information saved in cached memory. If the network address subject to the DNS lookup request is available in the caching memory of the server 20a for the ISP 12, the network address information is provided in a response to the mail server 16.

If the DNS caching server 20a does not have the address already stored, the DNS caching server must send 32 a request to the network root server 22. The root server 22 responds to the ISP with a referral (network address) of the root server of the generic top level domain 23 (GTLD) associated with the service provider of the recipient. The caching DNS server 20a of the sender's ISP then sends a new request to the GTLD root server 23a of the recipient for the network address of the requested domain name. The root server 23a associated with the ISP of the recipient responds with a referral to the destination ISP's DNS server 20b. The caching DNS server 20a then sends a request 34 to the destination ISP's DNS server 20b for the network address of the recipient's mail server. The DNS server 20b responds with the network address of the recipient's mail server. The caching DNS server 20a then responds 28 to the initial request from its mail server 16 with the network address information.

Having received the recipient mail server network address, the sender's mail server 16 then sends the message 36 to the destination ISP's mail server 16b using the IP address returned from the DNS query. The e-mail to be delivered communicates using a conventional protocol, such as existing SMTP protocol. The user as the recipient 14b then retrieves 38 the e-mail from the mail server 16b.

Exemplary Method for Sending Unsolicited Messages

Figure 2:
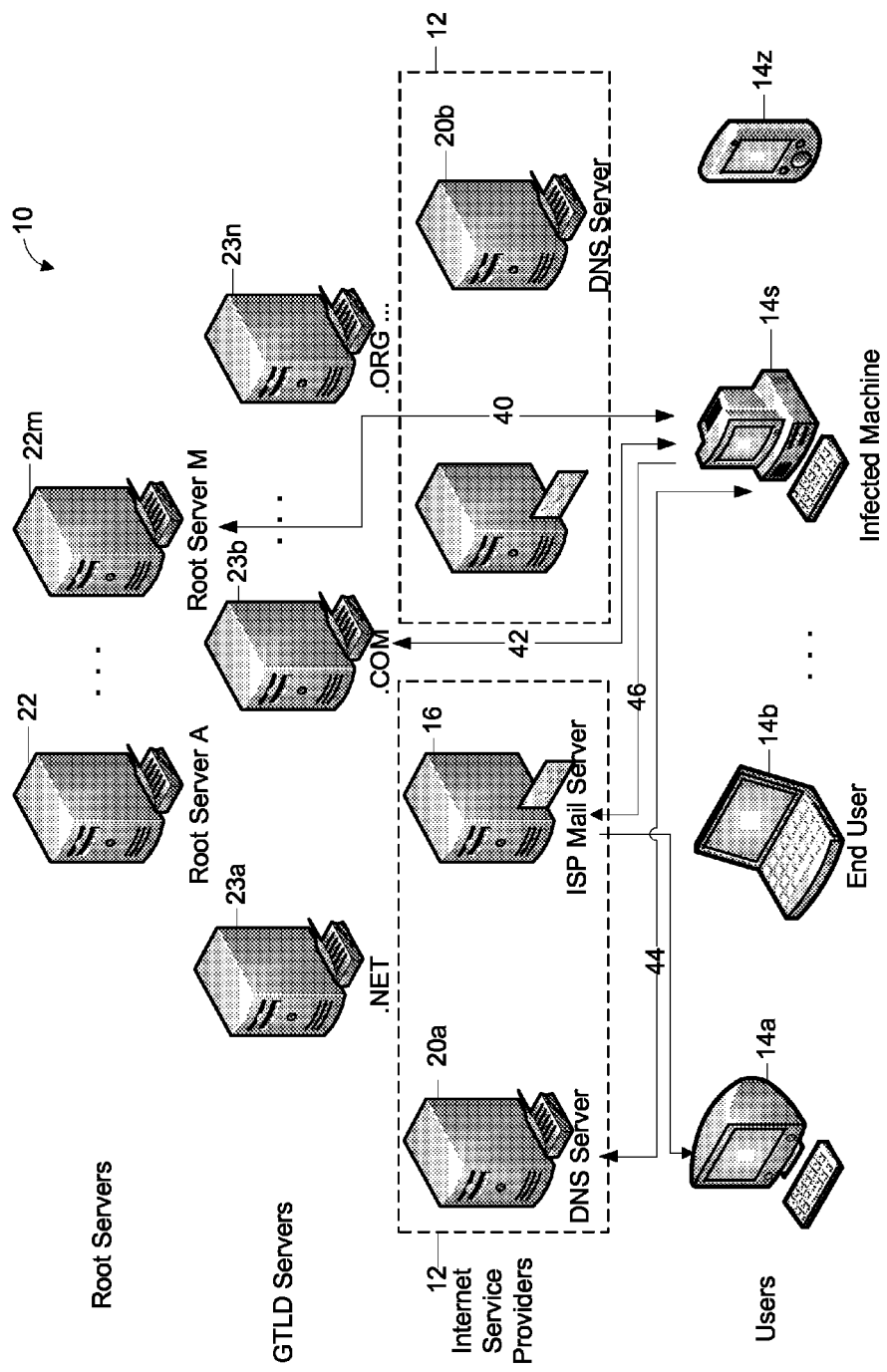
FIG. 2 illustrates an exemplary interaction in sending unsolicited e-mail messages to an e-mail user from a first e-mail user sending unsolicited e-mails.

FIG. 2 illustrates in a schematic diagram how a user might use a virus/Trojan infected computer of a user 14s to send large quantities of unsolicited mail. To send unsolicited mail (such as from an infected machine or from a computer owned by such sender), typically such sender does not use the ISP's caching servers. Spammers engaged in sending unsolicited mail have learned from experience that large volumes of e-mails place too much burden on the ISPs DNS servers. As a result, the sending computers are readily detectable and can be blocked.

Instead, the spammer makes requests 40, 42 directly to the internet root servers 22 and to the GTLD root servers 23 mimicking the typical behavior of a DNS server 20. Ultimately, the spammer sends 44 a request to the destination ISP's DNS server 20a. The DNS server 20a then returns the network address of the recipient or end user's mail server(s) 16. The spammer then sends 46 e-mail from the infected computer 14s to the ISP's mail server 16 for the recipient. The recipient end user 14a then retrieves the unsolicited e-mail from the mail server 16.

Figure 3:
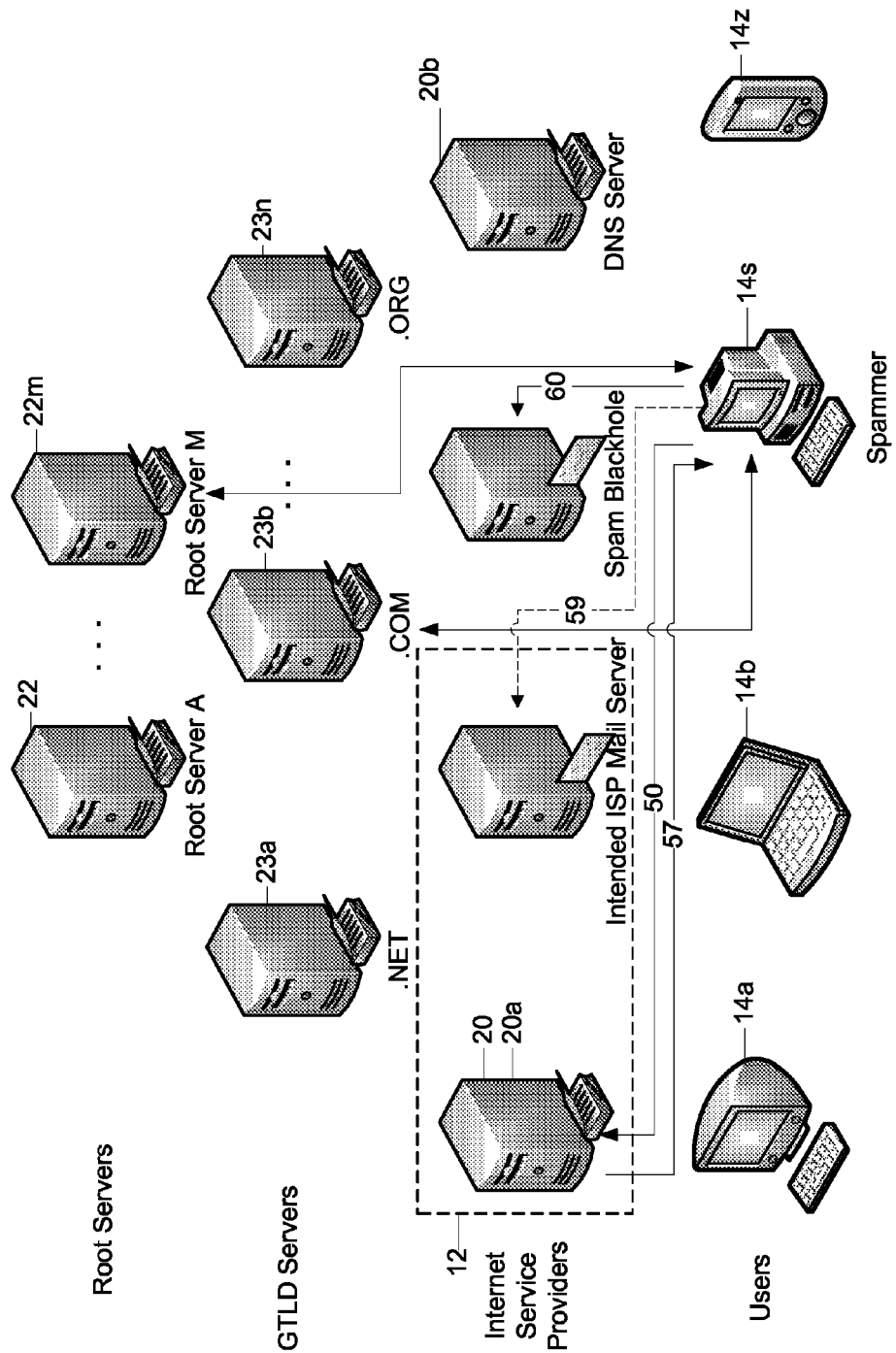
FIG. 3 illustrates a method of reducing demand on network bandwidth by blocking with an authoritative name server the transmission and distribution of messages from an e-mail user sending unsolicited e-mails, in accordance with the present invention.
Figure 4:
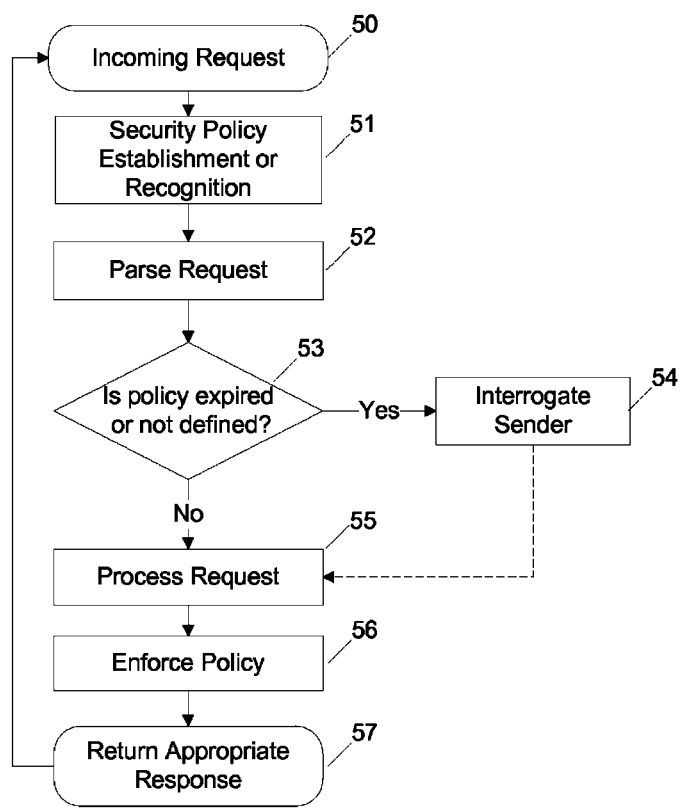
FIG. 4 is a flow diagram of the method in accordance with the present invention of controlling unsolicited messages and reducing demand on network bandwidth by blocking with an authoritative name server the transmission and distribution of messages from an e-mail user sending unsolicited messages.

Method for Controlling Unsolicited Messages in a Messaging Network Using an Authoritative Name Server FIG. 3 illustrates in schematic diagram the present invention that provides an authoritative DNS 20 configured to evaluate whether a request for a network address is a valid messaging request or is a request associated with a spammer sending unsolicited mail. FIG. 4 illustrates in a flow diagram a high level architecture of the method in accordance with the present invention of controlling transmission of an unsolicited message in a message system by applying and enforcing a security policy to a request for a network address of a proposed recipient of the message.

As noted above, spammers typically avoid using the ISP's 20a caching servers. Rather, spammers make requests directly to the network root servers 22 and GTLD root servers 23 mimicking the typical behavior of a DNS server.

With reference to FIGS. 3 and 4, the ISP's authoritative name server DNS server 20a receives 50 the request from a requester. The request provides the domain name of the user to which the e-mail is to be sent. The DNS server 20a applies or associates 51 a rules-based security policy to the incoming request based on the IP address of the requester. The DNS server 20a has a table or database of IP addresses from which requests for a domain name IP address have originated. The table includes a security policy for the IP address. A security policy is created if a requester is not present in the table or database. The security policy results from at least one interrogation as to the request. The invention further can include a separate table or database of domain names and a list of tests or interrogations to be applied in determining the security policy for the request.

The DNS server then parses 52 the request. If the security policy has expired or is not yet defined 53, the request is interrogated 54 to establish the security policy for the requester. The request either passes or fails the interrogation. Based on the results of the interrogation, the security policy is established. The security policy refers to whether the requester is attempting or likely attempting to send unsolicited e-mail (spam) and if so, the request is "invalid".

Depending on the validity of the request (i.e., the security policy shows the request passes or fails), the DNS server 20a prepares 55 a response to the requester. The DNS server 20 selects the response from several possible responses. The possible responses include (a) the network address that was requested or (b) not the network address that was requested. The responses for (b) not the network address that was requested include but are not limited to, a null response, an error response, or a network address associated with a receiving "user", or enforcement host name, that collects unsolicited e-mail pursuant to the security policy. The security policy is enforced 56 by creating a return message that includes the response for the request. The DNS server returns 57 the appropriate response to the requester.

The response is controlled by setting a validity factor based on the results of the interrogation. When the interrogation response identifies the request as "valid", a validity factor is set to a first value, for example, a (one) "1", a positive, a first character, "true", a first indicator, or the like. When the request is identified as originating from a spammer 14s, and thus, "invalid", the validity factor is set to a second value, for example, a (zero) "0", a negative, a second character, "false", a second indicator, or the like. The first and second values are comparative opposites. The validity factor set as the second value causes the message sought to be sent to be discarded by the requester and thereby not occupy network bandwidth and not become unsolicited e-mail in the recipient's e-mail. Alternatively, the response can be a network address for a server dedicated to collecting such unsolicited e-mail.

If an address is received, the spammer then establishes a connection based on the network address returned from the authoritative name server and attempts to deliver e-mail using standard SMTP protocol 59. However, in accordance with the present invention using the configured DNS server 20a that applies and enforces the security policy, the ISP's mail server is never contacted by the spammer. This reduces the overall network load on that resource, and the intended recipient end user never receives the e-mail. In the scenario in which the response provides 60 the "collector" address for sending the message, the response gives the spammer the appearance of success. Alternately, the response indicates to the spammer that the intended recipient does not exist, depending on how the e-mail server is configured.

Initial Connection and Establishing Security Policy

Figure 5:
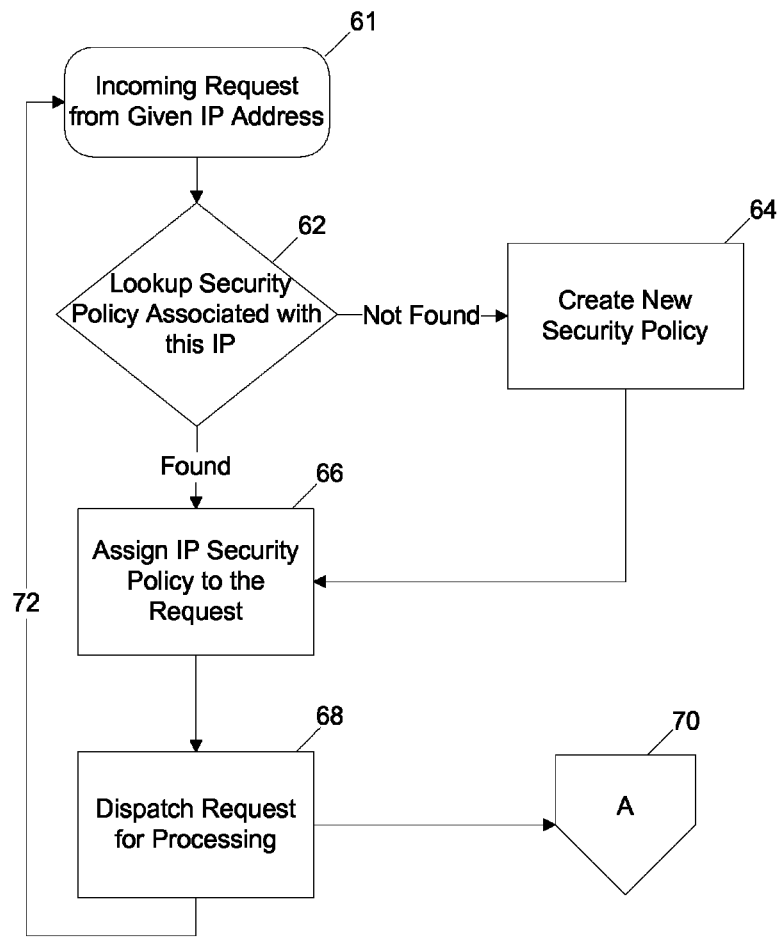
FIG. 5 is a flow diagram illustrating a portion of the method in accordance with the present invention of controlling transmission of an unsolicited message in a message system applying a security policy to a request for a network address.

FIG. 5 is a flow diagram illustrating a portion of the method in accordance with the present invention of controlling unsolicited messages and reducing demand on network bandwidth by blocking with an authoritative name server the transmission and distribution of messages from an e-mail user sending unsolicited messages or e-mails. The methods resolve DNS requests by a given IP address through the use of the security policy.

FIG. 5 illustrates the attaching of the security policy to the request based on the IP address of the requester. The incoming request 61 to the authoritative DNS server includes both the requested domain name of the recipient and the IP address of the requester. The DNS server 20 uses the requester's IP address to access 62 in the database table or in-memory cache (or other mechanism) the security policy associated with this IP address. If no security policy is found, the DNS server 20 creates 64 a new one and sets the status for future validation. The DNS server 20 then assigns 66 the policy to the request and dispatches 68 the request for processing 70. The initial processing for assigning a security policy is then repeated 72 for the next request for a domain name address.

Request Processing

Figure 6:
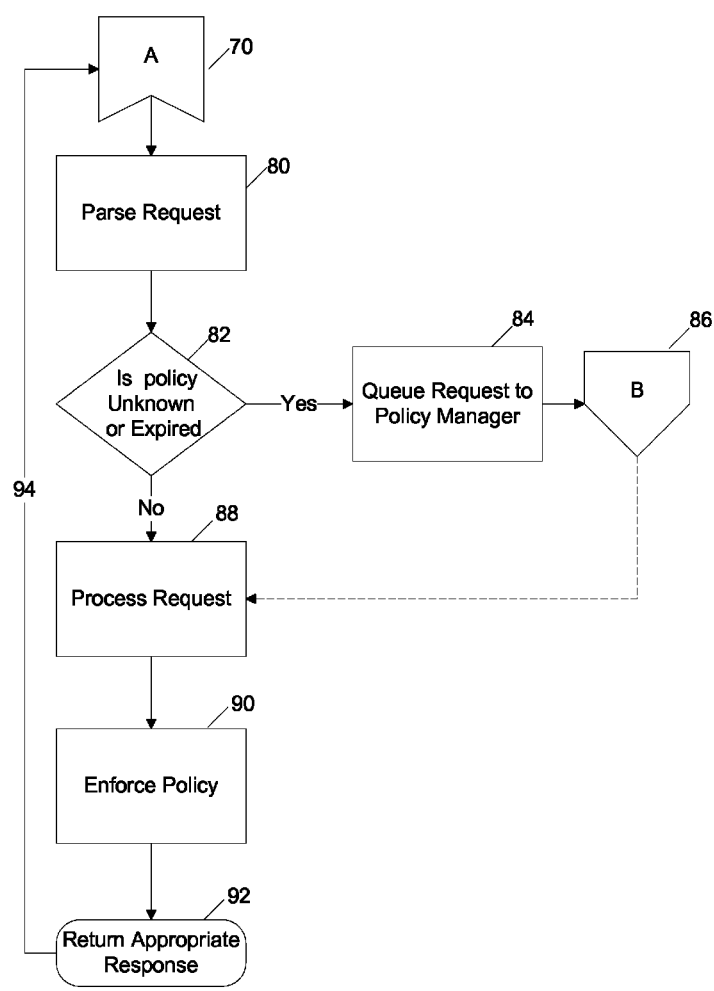
FIG. 6 is a flow diagram that describes the processing by the authoritative name server of the request for a domain name in the method of reducing demand on network bandwidth in accordance with the present invention.

FIG. 6 illustrates a flow diagram for the processing by the authoritative name server 20 of the request for a domain name in the method of controlling unsolicited messages and reducing demand on network bandwidth in accordance with the present invention. The request is processed after the security policy of the requester is associated with the request, as discussed above. The security policy involves one or more interrogations to evaluate whether the request for a recipient's domain name address is valid. This interrogation processing may be handled in a separate process or thread, or can be implemented in-line with establishing the security policy.

The request is parsed 80 to determine various additional information about the request including the queried hostname, the query type, flags, and additional information conventionally found in a DNS question and header information. This information is put into an internal structure for easy retrieval during processing.

Once the request is parsed, the security policy is checked 82 to determine if the policy is expired (if a time limit was established) or if the policy requires validation. If expired, or validation is required, the request is sent 84 to the policy manager for additional processing 86.

The request is processed 88. Processing a DNS request can be handled in a variety of ways, orthogonal to these methods. However, at the conclusion of request processing policy is enforced 90. Enforcement occurs in a number of different ways based on server settings or per-domain preference. This may include dropping the request, returning differing resource records based on policy, returning one of several different errors (SERVFAIL, NXDOMAIN, etc.), or other enforcement procedures. This also includes any new DNS response mechanisms that may be implemented in the future. A response, if one is to be sent, is then returned 92 and the next message is processed 94.

Policy Manager

Figure 7:
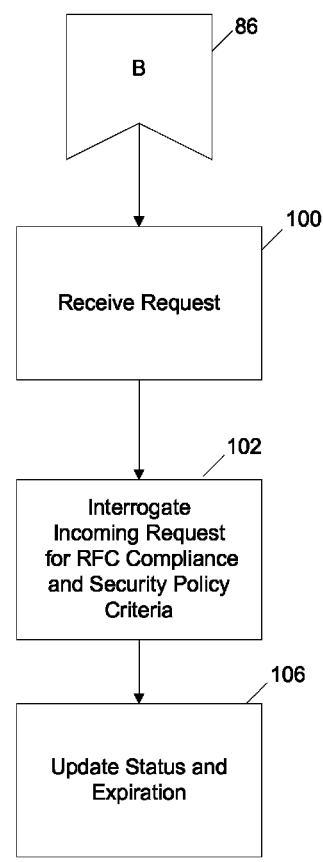
FIG. 7 is a flow diagram that describes the process of interrogating a request for a domain name address in the method of reducing demand on network bandwidth in accordance with the present invention.

FIG. 7 illustrates as a flow diagram the validation process of interrogating a request for a domain name address through the operation of the policy manager in the method of controlling unsolicited e-mail and reducing demand on network bandwidth in accordance with the present invention. The interrogation may be handled in a separate process or thread, or can be implemented in-line with the request processing. The policy manager retrieves 100 the IP address, security policy context, and the parsed message for processing through one or more interrogations. The policy manager uses various criteria to interrogate 102 the request. These interrogations include RFC compliance checks, checks against identified known spammer IP addresses, among other security policy criteria. Checks can include DNS based services, database lookups, list comparisons, in-memory caches, among others. Alternatively, the security policy can permit returning the requested network address without conducting interrogations. Based on these checks, the status of the security policy is updated 106, along with the expiration of the current request. The IP security policy table (or other mechanism) may also be updated at this point for future requests.

The interrogations 102 include a comparison of an identification of the source of the domain name request with a list of identified senders of unsolicited messages. If a match is determined (i.e., the requester is included on the list by the blacklist service), the request fails the interrogation and the validity factor is set to the second indicator as not valid. Another interrogation compares the time interval between the current domain name request and the immediate prior domain name request from the requester. If the time interval is less than a predetermined value, the request fails the interrogation and the validity factor is set to the second indicator as not valid. Another interrogation compares each of a plurality of data fields in the domain name request to a predetermined criteria. If any data field fails to satisfy the respective criteria, the request fails the interrogation and the validity factor is set to the second indicator as not valid. Another interrogation evaluates the length of the request to a predetermined maximum packet length. If the request equals or substantially equals the predetermined value, the interrogation fails and the validity factor is set to the second indicator as not valid.

Another interrogation compares the requester's domain name (the ISP for the requester), with a table of domain name requesters requesting a domain name. Each requester has an associated requester factor. The factor is based on different criteria. One criteria is the frequency of the requester making a request to the domain name server. An analyzer within the configured DNS server updates the table upon each request made by the requester. If the requester factor exceeds a predetermined value, the interrogation fails, and the validity factor is set to the second indicator as not valid. The frequency represents a determined ratio of the number of requests made to the DNS server within a predetermined period.

Generally, the interrogation is accomplished by an analyzer that interrogates the domain name request according to an enforcement policy associated with the requester and if the domain name request fails to satisfy the enforcement policy, the request fails the interrogation, and the validity factor is set to the second indicator as not valid.

Weighted Score Analysis

In another aspect, the analyzer in the present invention develops a weighted score based on the results of the various interrogation tests that are selectively applied against the DNS request that was made by the requester. The validity factor is set as passed or failed as discussed above, based on the weighted score in comparison to a pre-defined risk threshold for the domain name subject of the request. The risk threshold is assigned by the server or domain name that is subject of the domain name request. The DNS server maintains information associated with a domain name including an identification of the interrogation test(s) to be applied against a DNS request for the particular server or domain name and a threshold for pass or failure of the DNS request. This information can be maintained by the DNS server, such as a database, a look-up table, or other way. If a test is passed, a score for the test is zero. If the test is failed, the score is a predetermined weighted value. The value is indicative of the relative seriousness or importance of the test to a determination of whether the request is probably one that should be rejected as likely involving an unsolicited message.

For example, a domain name may have assigned four tests for validating a DNS request: a recursion flag check, a first blacklist service check, a second blacklist service check, and a time interval check. The test score can be zero ("0") if the test is passed, or some range of numbers reflective of the relative weight of the test to the determination of whether the request should be passed or failed. For example, a failed test can have a score value of 1, 2, or 3. In the example, the domain name has a predefined threshold value of 4.

This example assumes the DNS request is the first one received by the DNS server from the requester within the time interval. The tests selected for interrogation of the request are conducted. The example request has the RD flag (recursion flag) set, and as a result, the test yields a score of 1. A positive response from the first blacklist check yields a score of 3; that is, the requester is listed on a blacklist by the first list service and the weighted score reflects the importance of the test. The second blacklist check however does not show that the requester is listed for the second list service, and this yields a score of zero. The time interval test also is negative, as this is the first DNS request by this requester within the allowed time interval. This test yields a score of zero "0". The sum of the scores of the tests applied by the analyzer against the DNS request equals "1+3+0+0", or a weighted score of 4. This weighted score does not exceed the threshold of the domain name subject of the DNS request. The weighted score must exceed the threshold in order for the DNS request to fail. While it is likely the request is from a bulk e-mailer sending unsolicited e-mail, the validity factor is set to indicate the request passes the interrogatories and the domain name address can be returned to the requester.

Continuing with this example, a second DNS request by this requester for the domain name is made within the time interval. The three prior tests yield their respective scores; the time interval test now yields a score of 2. The weighted sum of the tests is now 6, and in response of the comparison with the threshold for the domain name, the validity factor is set to indicate that the DNS request fails.

The score values for each test, the number of tests to be conducted against a request, and the threshold, are selectively defined for each domain name and maintained by the analyzer.

Operation

In operation, the unsolicited e-mail control system performs better with the more requests that are handled and the more domains that are hosted on the configured DNS server. There are efficiencies in scale caused by requests for one domain for a given IP address triggering policy enforcement that is then used by other domains DNS hosted on the server(s).

Through certain methods one can determine whether a DNS request is coming from a legitimate e-mail source, or from a spammer, and as a result, return different responses based on that information. There are multiple methods for determining the legitimacy of a request. Tests discussed above with reference to FIG. 7 can be performed to determine whether the request is valid, (or, whether more likely than not, the request is valid); that is, whether the requester seeks the recipients domain name address for a purpose of sending unsolicited messages. The validity factor is set in order for the domain name server to take the appropriate action depending on pass or failure of the interrogations. The validity factor determined by the interrogations is recorded in the IP address table as part of the security policy for the particular IP address. Further, the reputation of the requesting IP address (including results from real-time DNS blacklists) may be used, as well as compliance with the well-known standards for sending DNS queries when communicating with to an authoritative server.

Use of this technique is orthogonal to all other approaches to blocking spam. It can be employed with no changes to the actual DNS records for a domain (however, the system requires configuration of the authoritative name servers in accordance with the present invention). An advantage to using this method to blocking spam is that it reduces the amount of load (CPU, memory, bandwidth, and other resources) used by the destination e-mail servers. This can amount to significant cost savings.

It should be noted that the disclosed apparatus and method does not identify or block the entirety of unsolicited e-mail sent for delivery through the messaging network. Rather, the apparatus and method seeks to reduce a substantial number of unsolicited e-mails from entering the messaging distribution system. Also, false positives arising from the practice of this disclosed method can be difficult to track back to their source. However, there are mitigating factors for this. DNS servers for large network service providers (ISPs) e-mail servers always conform to industry standards (such as RFC standards), and are typically not listed in any real-time blacklist as such servers do not themselves send e-mail. Whitelists can also be employed for a pre-screened or approved e-mail sender.

The apparatus and method disclosed herein can be made and executed without undue experimentation in light of the present disclosure. While the apparatus and methods of this invention have been described in terms of illustrative embodiments, it will be apparent to those of skill in the art that variations may be applied to the apparatus and in the method steps or in the sequence of steps thereof described herein without departing from the concept, spirit and scope of the invention. All such similar substitutes and modifications apparent to those skilled in the art are deemed to be within the spirit, scope and concept of the invention as defined by the appended claims.

What is claimed is:

1. A computer-based messaging network for sending electronic mail between end users of the messaging network, the messaging network configured for reducing communication of unsolicited messages sent by at least one sender end user mimicking a valid request for a domain name address in order to send unsolicited electronic mail to a recipient end user, each end user accessing the computer-based messaging network through one of a plurality of network service providers using computers equipped with communications devices for interactive communication through an electronic mail server operated by the respective network service provider into and from the messaging network for sending and receiving electronic messages between end users, each end user having a unique local name associated with the respective network service provider, which local name in combination with a domain name of the network service provider defines a unique electronic mail address that allows end users to send and receive messages, the electronic mail server of the network service provider coordinates sending and delivery of electronic mail for the end users thereof, the network service provider further including one or more DNS servers that maintain a list of domain names and associated network addresses by which the DNS server responds to requests from the respective electronic mail server for the network address of a domain name to which electronic mail is to be sent to an end user, the network also including at least one final authoritative index of the network service providers including the network address at which the network service provider can be reached within the network, the final authoritative index maintained by an authoritative domain name microprocessor computer and validly accessed by the DNS server of the network service provider in the event the DNS server is unable to provide the network address of the domain name to which electronic mail is to be sent, the computer-based messaging network further comprising:
- an authoritative domain name microprocessor computer configured (i) for server-side reduction of unsolicited messages communicated through the network in response to receiving a domain name request from one of a plurality of requesters operating within a network served by the authoritative domain name microprocessor computer, said one requester associated with a sender end user to send an electronic message to a recipient end user, the domain name request made by the requester for the purpose of obtaining a network address associated with a domain name of the recipient end user maintained by the authoritative domain name microprocessor computer in the final authoritative index and (ii) for communicating a response to the requester;
- at least one sender end user bypassing the DNS server and mimicking a requester and making a domain name request directly to the authoritative domain name microprocessor computer for obtaining a network address associated with a domain name of a recipient end user to receive an unsolicited message from the sender end user;
- an analyzer that interrogates the domain name request and in response to the interrogation sets a validity factor to a first indicator if the request passes the interrogation and to a second indicator if the request fails the interrogation, the interrogation at least evaluating the domain name of the requester to determine whether the domain name request originates with the one sender end user mimicking a requester; and
- a response generator that determines a response to the domain name request based on the validity factor, whereby the response provides the network address associated with the domain name subject of the request if the request passes the interrogation,
- whereby the authoritative domain name microprocessor computer responds to domain name requests made by a valid requester and, for reducing on the server-side the volume of unsolicited electronic messages communicated within the messaging network, rejects domain name requests made by the sender end user mimicking a valid domain name request made by the DNS server of one of the network service providers.

2. The computer-based messaging network as recited in claim 1, wherein the response generator is configured to provide a response that is not the network address associated with the domain name subject of the request if the validity factor is set to the second indicator.

3. The computer-based messaging network as recited in claim 2, wherein the response comprises a value indicating a server error, a non-existent domain was the subject of the request, or a refused request response by the authoritative domain name microprocessor computer.

4. The computer-based messaging network as recited in claim 1, wherein the response generator is configured to not send a response if the validity factor is set to the second indicator.

5. The computer-based messaging network as recited in claim 1, wherein the response generator is configured to provide a network address associated with an enforcement host name for receiving unsolicited messages from the sender end user if the validity factor is set to the second indicator, whereby the message is transmitted to the enforcement host name of the recipient end user.

6. The computer-based messaging network as recited in claim 1, wherein the interrogation of the domain name request compares an identification of the source of the domain name request with a list of identified sender end users that send unsolicited messages and if a match is determined, the validity factor is set to the second indicator.

7. The computer-based messaging network as recited in claim 1, wherein the interrogation of the domain name request compares the time interval between the current domain name request by the requester and the prior domain name request by the requester and if the time interval is less than a predetermined value, the validity factor is set to the second indicator.

8. The computer-based messaging network in recited in claim 7, wherein the frequency represents a determined ratio of the number of requests made to the authoritative domain name microprocessor computer within a predetermined period.

9. The computer-based messaging network as recited in claim 1, wherein the interrogation of the domain name request compares each of a plurality of data fields in the domain name request to a predetermined criteria, and if any data field fails to satisfy the respective criteria, the validity factor is set to the second indicator.

10. The computer-based messaging network as recited in claim 1, wherein the interrogation of the domain name request evaluates the length of the request to a predetermined maximum packet length and if the length of the request equals the predetermine maximum packet length, the validity factor is set to the second indicator.

11. The computer-based messaging network as recited in claim 1, further comprising a table of domain name requesters requesting a domain name and a requester factor that indicates the frequency of the requester making a request to the domain name microprocessor computer, the analyzer updating the table upon each request made by the requester, and if the requester factor exceeds a predetermined value, the validity factor is set to the second indicator.

12. The computer-based messaging network as recited in claim 1, wherein the analyzer interrogates the domain name request according to an enforcement policy associated with the requester and if the domain name request fails to satisfy the enforcement policy, the validity factor is set to the second indicator.

13. The computer-based messaging network as recited in claim 1, wherein the interrogation compares the requester to a database of authorized requesters and if listed, the validity factor is set to the first indicator.

14. The computer-based messaging network as recited in claim 1, wherein the analyzer further comprises a list of interrogations to be applied against a request for a domain name, each interrogation having a predetermined first score if the request fails the interrogation and a predetermined second score if the request fails the interrogation, and a threshold value that if exceeded by the sum of the scores of the interrogations results in the validity factor set to the second indicator.

15. The computer-based messaging network as recited in claim 14, wherein the predetermined second score is weighted.

16. The computer-based messaging network as cited in claim 1, wherein the analyzer creates a score based on the weighted results of two or more interrogation tests, and sets a validity factor based on a pre-defined risk threshold associated with the domain name of the requester compared with the score.

17. A method of blocking communication of unsolicited messages in a computer-based messaging network configured for sending messages from sender end users to recipient end users with an authoritative domain name microprocessor computer configured to restrict transmission of an unsolicited message from a sender end user to a recipient end user, each end user accessing the computer-based messaging network through one of a plurality of network service providers using computers equipped with communications devices for interactive communication through an electronic mail server operated by the respective network service provider into and from the messaging network for sending and receiving electronic messages between end users, each end user having a unique local name associated with the respective network service provider, which local name in combination with a domain name of the network service provider defines a unique electronic mail address that allows end users to send and receive messages, the electronic mail server of the network service provider coordinates sending and delivery of electronic mail for the end users thereof, the network service provider further including one or more DNS servers that maintain a list of domain names and associated network addresses by which the DNS server responds to requests from the respective electronic mail server for the network address of a domain name to which electronic mail is to be sent to an end user, the network also including at least one final authoritative index of the network service providers including the network address at which the network service provider can be reached within the network, the final authoritative index maintained by an authoritative domain name microprocessor computer validly accessed by the DNS server of the network service provider in the event the DNS server is unable to provide the network address of the domain name to which electronic mail is to be sent, the method of the computer-based messaging network further comprising the steps of:

(a) providing in a messaging network an authoritative domain name microprocessor computer configured for (i) receiving a domain name request from a requester end user associated with a sender of a message to a recipient end user, the domain name request made for the purpose of obtaining a network address associated with the domain name of the recipient end user which network address is maintained by the authoritative domain name microprocessor computer in the final authoritative index and for communicating a response to the requester, and (ii) reducing on the server-side unsolicited messages communicated through the network;

(b) analyzing the domain name request based on an enforcement policy and in response setting a validity factor to a first indicator if the request passes the enforcement policy and to a second indicator if the request fails the enforcement policy, the enforcement policy at least evaluating the domain name of the requester to determine whether the domain name request originates with a sender end user that is mimicking a requester making a valid domain name request; and (c) returning a response to the domain name request based on the validity factor, the response comprising a network address associated with the domain name when the validity factor is set to the first indicator and the response comprising not the network address if the validity factor is set to the second indicator, whereby the validity factor set as the first indicator permits the message to be sent to the recipient end user and when set as the second indicator prevents the message from being sent to the recipient end user, whereby the authoritative domain name microprocessor computer responds to domain name requests made by a valid requester and, for reducing on the server-side the volume of unsolicited electronic messages communicated within the messaging network, rejects requests made by the sender end user mimicking a valid domain name request by the requester associated with a network service provider.

18. The method as recited in claim 17, wherein the step (c) returning comprises returning a response indicating a server error, a non-existent domain was subject of the request, or a refused request, if the validity factor is set to the second indicator.

19. The method as recited in claim 17, wherein the step (c) returns a network address associated with an enforcement host name for receiving unsolicited messages from the sender end user if the validity factor is set to the second indicator, whereby the message is transmitted to the enforcement host name of the recipient end user.

20. The method as recited in claim 17, wherein the enforcement policy in step (b) comprises comparing an identification of the source of the domain name request with a list of identified senders of unsolicited messages.

21. The method as recited in claim 17, wherein the enforcement policy in step (b) comprises comparing the time interval between the current domain name request by the requester and the prior domain name request by the requester, and if the time interval is less than a predetermined value, setting the validity factor to the second indicator.

22. The method as recited in claim 17, wherein the enforcement policy in step (b) comprises comparing each of a plurality of data fields in the domain name request to a predetermined criteria, and if any data field fails to satisfy the respective criteria, setting the validity factor to the second indicator.

23. The method as recited in claim 17, wherein the enforcement policy in step (b) comprises comparing the length of the request to a predetermined maximum packet length, and if the lengths are equal, setting the validity factor to the second indicator.

24. The method as recited in claim 17, wherein the enforcement policy in step (b) comprises comparing a table of domain name requesters requesting a domain name and a requester factor that indicates the frequency of the requester making a request to the authoritative domain name microprocessor computer, the analyzer updating the table upon each request made by the requester, and if the requester factor exceeds a predetermined value, setting the validity factor to the second indicator.

25. The method as recited in claim 17, wherein the enforcement policy in step (b) comprises comparing the requester to a database of authorized requesters and if listed, the validity factor is set to the first indicator.

26. The method as cited in claim 17, wherein the analyzer in step (b) creates a score based on the weighted results of two or more interrogation tests conducted according to the enforcement policy, and sets the validity factor based on a pre-defined risk threshold associated with the domain name of the requester compared with the score.

* * * * *